(12) United States Patent
Cantu-Paz

(10) Patent No.: US 8,332,775 B2  
(45) Date of Patent: Dec. 11, 2012

(54) ADAPTIVE USER FEEDBACK WINDOW

(75) Inventor: Erick Cantu-Paz, Sunnyvale, CA (US)

(73) Assignee: Yahoo! Inc., Sunnyvale, CA (US)

(*) Notice: Subject to any disclaimer, the term of this patent is extended or adjusted under 35 U.S.C. 154(b) by 1260 days.

(21) Appl. No.: 12/112,942

(22) Filed: Apr. 30, 2008

(65) Prior Publication Data

US 2009/0276729 A1    Nov. 5, 2009

(51) Int. Cl.
*G06F 3/048* (2006.01)

(52) U.S. Cl. .................. 715/811; 715/733

(58) Field of Classification Search .......... 715/733, 715/811
See application file for complete search history.

(56) References Cited

U.S. PATENT DOCUMENTS

| 8,055,655 B1* | 11/2011 | He et al. ............... 707/727 |
| 2003/0050916 A1* | 3/2003 | Ortega et al. ............ 707/1 |
| 2004/0186777 A1* | 9/2004 | Margiloff et al. ........ 705/14 |
| 2007/0022005 A1* | 1/2007 | Hanna .................... 705/14 |
| 2007/0112840 A1 | 5/2007 | Carson et al. |
| 2007/0162424 A1* | 7/2007 | Jeh et al. ................ 707/2 |
| 2008/0120278 A1* | 5/2008 | Roe et al. ................ 707/3 |
| 2008/0168099 A1* | 7/2008 | Skaf ..................... 707/104.1 |

OTHER PUBLICATIONS

Datar et al., "Maintaining Stream Statistics over Sliding Windows" 2002 Annual ACM-SIA (Symposium on Discrete Algorithms (SODA 2002), Jul. 30, 2001, 14 pages.
Jiang et al., "A novel variable-length sliding window blockwise least-squares algorithm for on-line estimation of time-varying parameters" International Journal of Adaptive Control and Signal Processing, vol. 18, Jun. 17, 2004, pp. 505-521.

* cited by examiner

*Primary Examiner* — Omar Abdul-Ali
(74) *Attorney, Agent, or Firm* — Berkeley Law & Technology Law Group, LLP (57) ABSTRACT

The subject matter disclosed herein relates to maintaining a history of user interaction data within a sliding window, where the sliding window may be sized based at least in part on a quantification of such user interaction.

16 Claims, 3 Drawing Sheets

ADAPTIVE USER FEEDBACK WINDOW

BACKGROUND

Data processing tools and techniques continue to improve. Information in the form of data is continually being generated or otherwise identified, collected, stored, shared, and analyzed. Databases and other like data repositories are commonplace, as are related communication networks and computing resources that provide access to such information.

The Internet is ubiquitous; the World Wide Web provided by the Internet continues to grow with new information seemingly being added every second. To provide access to such information, tools and services are often provided, which allow for the copious amounts of information to be searched through in an efficient manner. For example, service providers may allow for users to search the World Wide Web or other like networks using search engines. Similar tools or services may allow for one or more databases or other like data repositories to be searched.

With so much information being available, there is a continuing need for methods and systems that allow for pertinent information to be analyzed in an efficient manner. Search engines, such as, for example, those provided over the web by Yahoo!, Google, and other web sites may be used by individuals to gather information. Typically, a user may input a query term and/or phrase and the search engine may return one or more links to sites and/or documents related to the query. The links returned may be related, or they may be completely unrelated, to what the user was actually looking for. The "relatedness" of results to the query may be in part a function of the actual query entered as well as the robustness of the search system (underlying collection system) used.

DESCRIPTION OF THE DRAWING FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description when read with the accompanying drawings in which:

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by the appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Online retrieval systems such as web search and sponsored search may track user interaction with electronic documents. Such user interactions may be utilized as input to a function that predicts the relevance or attractiveness of such electronic documents. For example, a result set of a plurality of electronic documents may be generated by a search engine and the electronic documents within the result set may be ranked according to a predicted relevance. In one example, a search engine may return a set of electronic documents in an ordered list of results and present them to users. Such a search may be of web documents, sponsored search advertisements, images, and/or any other electronic documents that may be stored and/or retrieved by a computing platform. The order in which such a set of electronic documents are presented may be important to a user, as a user may expect the most relevant or interesting documents to appear ranked first. Ranking systems of web searches and/or sponsored searches may have components that are based on examining a history of queries and of user interaction with the electronic documents within the result set. An examination of logs containing queries, result sets of electronic documents presented to users, and/or levels of user interactions with such electronic documents may facilitate a calculation of certain features that may be used as a predictor of a given electronic document's relevance to a given query.

As used herein, the term "electronic document" is meant to include any information in a digital format that may be perceived by a user if displayed by a digital device, such as, for example, a computing platform. For one or more embodiments, an electronic document may comprise a web page coded in a markup language, such as, for example, HTML (hypertext markup language). However, the scope of claimed subject matter is not limited in this respect. Also, for one or more embodiments, the electronic document may comprise a number of elements. The elements in one or more embodiments may comprise text, for example, as may be displayed on a web page. Also, for one or more embodiments, the elements may comprise a graphical object, such as, for example, a digital image.

As will be described in greater detail below, embodiments described herein may relate to maintaining data regarding user interaction with electronic documents. Such procedures for data maintenance may be utilized for accurate estimation of document relevance. Further, such procedures for data maintenance may be adapted so as to adjust to changes in the system or environment, such as significant changes in levels of user interaction.

As used herein, the term "user interaction" is meant to include measurable interaction of one or more users with a web search, sponsored search and/or other online retrieval systems. For example, such user interaction may comprise user impressions. Such user impressions may comprise a quantification of the numbers of views of a given electronic document, such as an advertisement, for example. Additionally or alternatively, such user interaction may comprise a click through rate. Such a click through rate may comprise a quantification of the success of an online advertising campaign. For example, a click through rate may be determined by dividing a number of users who clicked on an electronic document by the number of times the electronic document was viewed. However, these are merely examples of how a user interaction may be quantified, and claimed subject matter is not limited in this respect.

Online retrieval systems may use feedback systems to monitor user interactions, such as to capture how often users clicked on specific results. These user interaction feedback features may be used to calculate how relevant or attractive the users found the results in the past, and may be used to influence the ranking of results in the future. Therefore, it may be useful to have a system that provides an accurate estimation of user interactions and that may provide some form of user interaction history to as many electronic documents as possible.

To achieve an increase in accuracy, user interaction feedback systems may have a data history that looks at long time intervals in the past. Such an approach is known as sliding windows. As used herein the term "sliding window" is meant to include a field or group of fields containing a data history over a defined time interval. Such a time interval may comprise a duration of time known as the window length.

Figure 1:
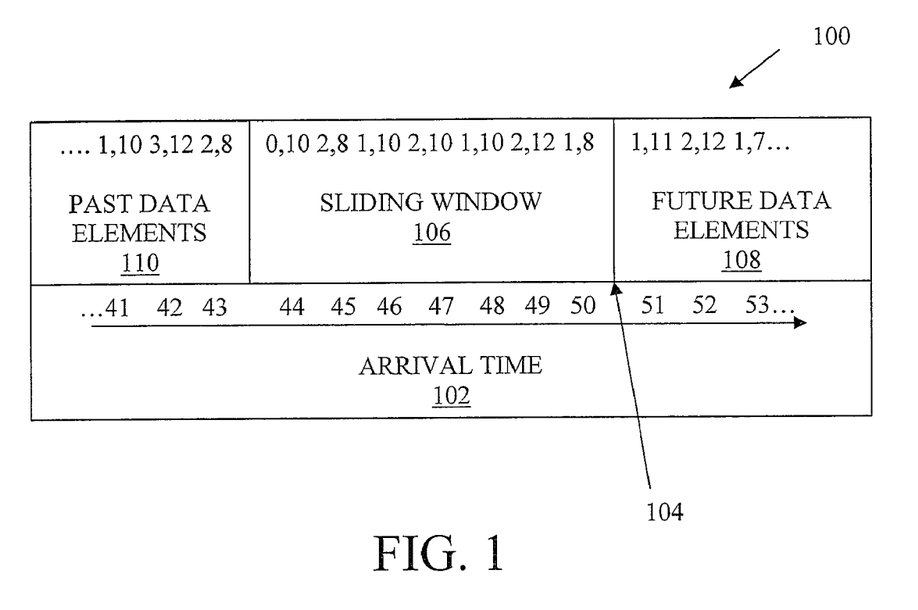
FIG. 1 is a schematic diagram illustrating an example data history including a sliding window in accordance with one or more embodiments.

FIG. 1 is a schematic diagram illustrating an example data history including a sliding window in accordance with one or more embodiments. As illustrated, data history 100 may track user interaction with electronic documents. User interaction data may be accumulated over multiple discrete time periods. For example, arrival time 102 may indicate such a discrete time period, such as over the period of a day, or the like. Here a series of discrete time periods are illustrated as occurring consecutively one after another over an increasing amount of time. A current time 104 marks the separation between a sliding window 106 and future data elements 108. Sliding window 106 may encompass a set of user interaction data extending from current time 104 into the past over a finite time interval. Beyond the finite time interval of sliding window 106 there are past data elements 110 that have lapsed beyond the finite time interval of sliding window 106. As illustrated, user interaction data may include one or more interaction criteria. For example, the user interaction data here is illustrated as data pairs of user impressions and user clicks. Alternatively, more or fewer user interaction criteria may be utilized, including other types of criteria. As illustrated, the user interaction data can be visualized as a constant stream of information stretching into the past and future, either preceding or following current time 104.

Figure 2:
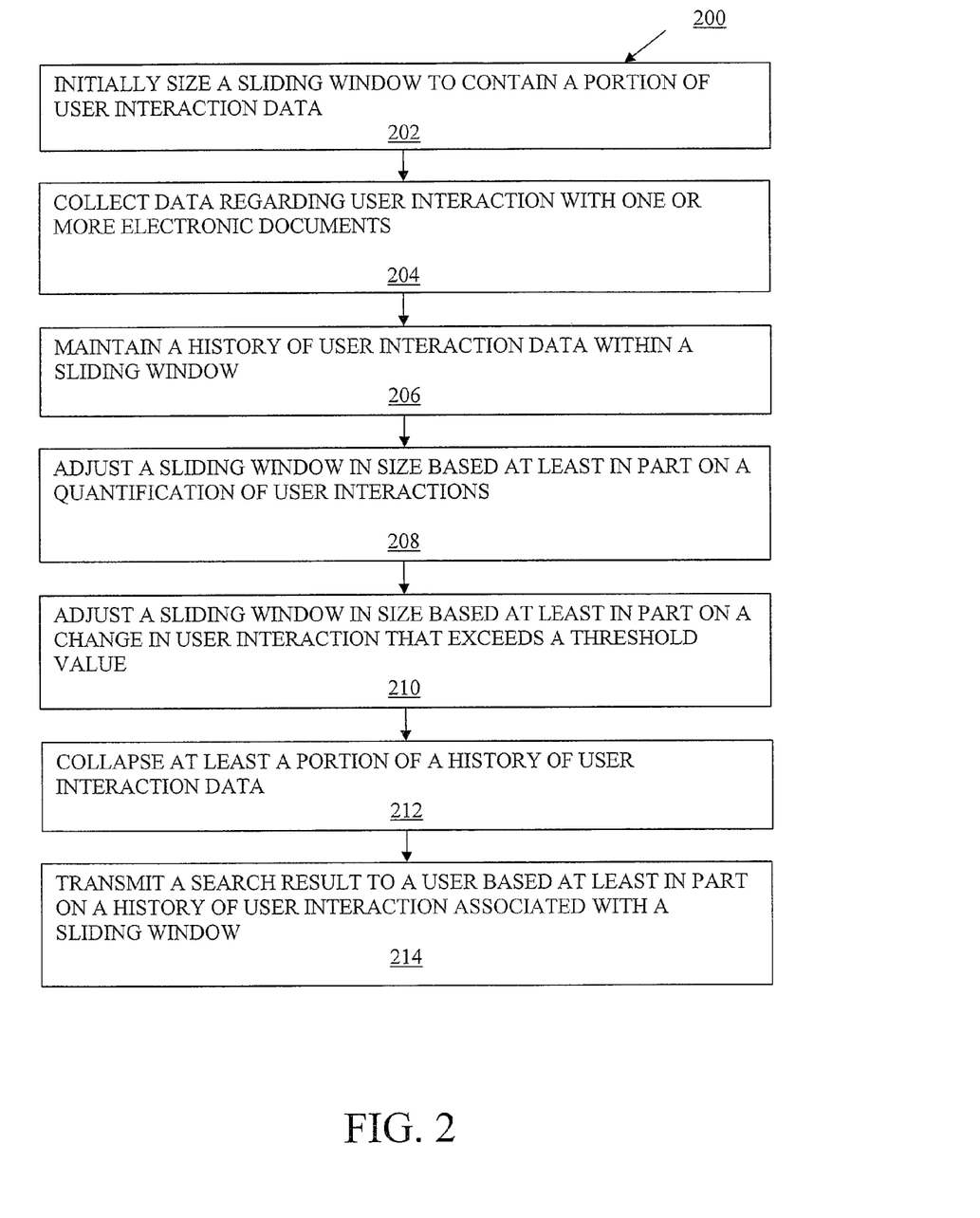
FIG. 2 is a flow diagram illustrating a procedure for adjusting the size of sliding windows based at least in part on a quantification of user interaction in accordance with one or more embodiments.

Procedure 200, as illustrated in FIG. 2, may be used to adjust the size of sliding windows based at least in part on a quantification of user interaction, for example, although the scope of claimed subject matter is not limited in this respect. Additionally, although procedure 200, as shown in FIG. 2, comprises one particular order of blocks, the order in which the blocks are presented does not necessarily limit claimed subject matter to any particular order. Likewise, intervening blocks shown in FIG. 2 and/or additional blocks not shown in FIG. 2 may be employed and/or blocks shown in FIG. 2 may be eliminated, without departing from the scope of claimed subject matter.

Procedure 200, depicted in FIG. 2, may in alternative embodiments be implemented in software, hardware, and/or firmware, and may comprise discrete operations. As illustrated, procedure 200 may be used for maintaining a history of user interaction data within a sliding window, where the sliding window may be sized based at least in part on a quantification of such user interaction. Multiple procedures may be utilized to maintain the history within a sliding window. For example, an insertion policy may be utilized to define how new data may be incorporated within a sliding window. Further, a forgetting policy may be utilized to define how old data may be discarded from a sliding window. Lastly, some aspect of data organization, such as a basic file structure and/or limits on the window length may be utilized to define a sliding window.

Starting at block 202, a sliding window may be initially sized to contain a portion of user interaction data. Such a sliding window may be initially sized based at least in part on a maximum and/or a minimum time frame. Sliding window sizes also may be preliminarily determined so as to ensure a history that is statistically large enough so as to accurately predict new data. For example, sliding window sizes may also be preliminarily determined so that a prediction error of a model that uses a given history is low enough to accurately predict new data.

A sliding window may be sized based at least in part on a maximum time frame. Additionally or alternatively, a sliding window may be sized based at least in part on a minimum time frame. Such a maximum and/or a minimum time frame may provide bounded sliding window sizes. Sliding window sizes may be bounded based on a maximum time frame so as to have a maximum window length and/or a maximum list size. Such a maximum time frame may keep an upper bound on storage and computation requirements. Additionally or alternatively, sliding window sizes may be bounded based on a minimum time frame so as to truncate the window length and/or list size. Such a minimum time frame may maintain a minimum number of time periods (e.g. a minimum number of days) that may be anticipated as needed to accumulate a desired number of user interactions, such as user impressions. For example, such a minimum time frame may be enforced so as to explicitly keep history for multiple time periods (e.g. a minimum number of days) even for high-frequency electronic documents that may meet a desired number of user interactions in a shorter time period.

At block 204, data regarding user interaction with one or more electronic documents may be collected. At block 206, a history of such user interaction data may be maintained within a sliding window. In one example, in order to increase the reliability of estimates of user interactions, historical user interaction information may be aggregated across different dimensions. For example, user interaction information may be aggregated temporally. Additionally or alternatively, user interaction information may be aggregated in other ways. For example, multiple queries and/or multiple documents that may be semantically similar may be aggregated. Similarly, a hierarchy that exists among multiple documents may be exploited to facilitate aggregation. For example, instead of aggregating data at the level of individual electronic documents, user interactions may be computed based on a given name of an Internet host where such electronic documents are stored (e.g., shopping.yahoo.com) and/or based on a given domain name (e.g., yahoo.com). Other types of hierarchies also may be utilized without departing from the claimed subject matter. For example, sponsored search advertisements may be grouped among accounts, campaigns, ad groups, and/or the like. As used herein, the term "item" is intended to denote any level of aggregation of the user interaction data associated with one or more electronic documents. For example, an item may be associated with a query-ad pair, an advertiser account, and/or the like.

User interaction data may be organized within sliding window files where each row represents one item (e.g., an ad, an account, etc.) for which a history is maintained. Each row may have a key for identifying a given item and a list of user interaction data values. Such a list of user interaction data values may have the most recent data listed first, for example. Such a list of user interaction data values may be partitioned into a plurality of data nodes, where each node may contain data associated with a specific time period. For example, at the conclusion of a given time period (e.g., a single day) user interaction data may be calculated from raw data logs and added to the list using an insertion policy. Such an insertion policy may be utilized to define how new data may be incorporated within a sliding window.

In one example, a history may be maintained by calculating statistics for each day explicitly. An insertion policy may result in insertion of the daily statistics of user interactions to the front of the list within a sliding window. After inserting the new user interaction data, whatever bounds that may have been established on the size of the sliding window may be enforced and the sliding window may be truncated so as to shorten the list of user interaction data so as to eliminate one or more items of older data. For example, a user interaction feature of interest may be click through rate, so daily statistics may be assembled to quantify clicks and impressions for a given time period (e.g., a single day). For a given item X, a history after seven day time periods might include a set of seven click/impression pairs, as follows:

X—0,10 2,8 1,10 2,10 1,10 2,12 1,8

If in the next day, this given item X received 3 clicks and 13 impressions, the list may be updated, as follows:

X—3,13 0,10 2,8 1,10 2,10 1,10 2,12 1,8

If the maximum window length is set based on a maximum time frame of seven days, the oldest node containing a 1,8 click/impression pair may be dropped from the list. The truncated sliding window for item X may then appear as follows:

X—3,13 0,10 2,8 1,10 2,10 1,10 2,12

At the same time that each item's history list is updated, a given user interaction feedback feature may be recalculated. For example, a history may be accessed once for updates and calculation of user interaction feedback features. In the case of a click though rate-type user interactions, total clicks (e.g., 11=3+0+2+ . . . +2) may be calculated, total impressions (e.g., 73=13+10+ . . . +12) may be calculated, and total clicks may be divided by total impressions to obtain a click through rate (e.g., 11/73).

At block 208, a sliding window may be adjusted in size based at least in part on a quantification of user interactions. Such a quantification of user interaction may comprise user impressions of electronic documents. For example, a sliding window may be adjusted in size so as to include at least a desired number of impressions. A desired volume of user interaction data may be preliminarily determined so as to ensure a history that is statistically large enough so as to accurately predict new data. For example, sliding window sizes may be adjusted so as to encompass a desired volume of user interaction data so that a prediction error of a model that uses a given history is low enough to accurately predict new data. Accordingly, if a volume of user interaction data begins to decrease, a corresponding sliding window may be adjusted to be increased in size. With an increased window size, additional data may be maintained within such a sliding window and the overall data volume contained within such a sliding window may be maintained with an increased consistency. Similarly, if a volume of user interaction data begins to increase, a corresponding sliding window may be adjusted to be decreased in size.

During use of sliding windows, there may be a tradeoff between various fixed time intervals to size the sliding windows. For example, longer fixed time intervals result in larger sliding windows that may facilitate accumulating enough data to compute accurate estimates. However, shorter fixed time intervals result in smaller sliding windows that may facilitate increased sensitivity to recent and/or sudden changes in the environment. Using a fixed sliding window length means that one of the alternatives may be preferred over the other with a long window favoring accurate estimates and slower adaptation, while a short window favors noisy estimates and faster adaptability.

The above operation of adjusting the size of sliding windows based at least in part on a quantification of user interactions may offer several advantages fixed time interval-type sliding windows. For example, adjusting the size of sliding windows according to a volume of user interaction data may operate so as to react to significant changes in streams of user interaction data. Such volume based adaptation of sliding windows may provide accurate estimates of user interaction for low-frequency items and/or rapid adaptability for high-frequency items.

At block 210, a sliding window may be adjusted in size based at least in part on a change in user interaction that exceeds a threshold value. Such a change in user interaction may comprise a change in click through rate. For example, a sliding window may be adjusted in size so as to compensate for a significant change in click through rate.

Accordingly, at block 210 a forgetting policy for a given sliding window may be extended to include a change detection component. If a change in user interaction is detected, data that predates such a change may be discarded. For example, a size of a sliding window may be adjusted so that the window length is shortened to exclude the time period before the change.

There may be different types of changes in user interaction that could be considered. Two exemplary types of changes may include a change in data volume and/or a change in performance. For example, a change in data volume resulting in a data volume increase may result in procedure 200 adjusting (e.g., shortening) the sliding window length if a desired number of user impressions is reached, per block 208. A decrease of data volume may be problematic depending on the application. For example, estimates may be biased by older user interaction data during a decrease of data volume. Accordingly, a decrease of data volume may result in procedure 200 adjusting the sliding window at block 210 by shortening the length of a given sliding window so as to exclude the time period before the change in data volume.

Further, adjusting a sliding window at block 210 based on changes in performance, such as increases in click through rate, may adapt window size as a function of the magnitude of the change. For example, large changes in user interaction may result in shorter windows. For example, window length adaptations that depend on the nature of the change (abrupt or gradual) may be made according to procedures set forth in more detail in J. Jiang and Y. M. Zhang, "A Novel Variable-Length Sliding Window Blockwise Least-Squares Algorithm for On-Line Estimation of Time-Varying Parameters", *International Journal of Adaptive Control and Signal Processing*, 2000, 18(6): 505-521. Such change detection and/or sliding window adjusting may be done in the same scan as updates to the history.

At block 212, at least a portion of history of such user interaction data may be collapsed. Such collapsing may comprise at least one node in a history containing data collapsed together from two or more other nodes. Additionally or alternatively, such collapsing may result in at least one node in a history containing data gathered over a given time period and at least one other node containing data gathered over two or more of such given time periods. However, when a given history is initially started, there may not be any multiple-period nodes.

For example, procedure 200 may aggregate history from multiple nodes representing single time periods into a single node representing multiple time periods. However, this is merely an example, and such collapsing of multiple nodes into a single node may not be dependent on the given durations of any particular nodes being collapsed. Such aggregation may reduce the storage and computations, helping procedure 200 to scale up to longer time windows. For each item, there may be a list in a sliding window as before with minimum and maximum window lengths. However, an insertion policy may be modified so as to insert statistics for a given time period (e.g., a single day) at the front of the history list and to scan the list to determine if there are multiple time periods that may be combined into a single node. For example, once statistics for a given time period of a single day are inserted into a sliding window, procedure 200 may determine whether there is a sufficient number of single day nodes to combine together into a single multi-day node, such as a seven day node. In this example, a list may have nodes that represent one day of data (at the front of the list, for example) together with nodes that represent seven days (at the back of the list, for example). To facilitate such aggregation of multi-day nodes, each node in the list may specify how many days of data it represents. Such aggregation also may assume that daily summary statistics of user interaction may be aggregated without loss of precision. In the example of click through rate-type user interactions, the clicks and impressions of seven days of data may be added into the clicks and impressions for an entire week.

Under such aggregation of multiple nodes into a single node representing multiple time periods, a forgetting policy may be similar to cases where a list contained data only for a given time period (e.g., a single day). For example, the list of data may be truncated to maintain a maximum length and number of nodes. Such truncation may also maintain a minimum number of nodes required to reach a statistically significant number of user interactions. However, such a forgetting policy now may remove single nodes representing multiple time periods, such as nodes that represent seven days of history. In the example below, a list with two one-day entries as well as two seven-day entries is illustrated. For a given item X, a history might include a set of four time period/click/impression triplets, as follows:

X—1:0,10 1:2,8 7:15,50 7:17,60

Statistics of user interaction data may be added at the front of such a list, as illustrated below:

X—1:1,11 1:0,10 1:2,8 7:15,50 7:17,60

Similarly, another option may be to use multiple nodes of different size time periods. Such multiple nodes of different size time periods may be helpful to scale to sliding windows so that an extensive time period may be covered. In one example, assuming a forgetting policy may operate so as to forget a maximum of k days (say k=8) at a time. An exponential histogram or the like may be maintained within a sliding window. For example an exponential histogram may be made according to procedures set forth in more detail in Datar, Mayur; Gionis, Aristides; Indyk, Piotr; Motwani, Rajeev, "Maintaining Stream Statistics over Sliding Windows", 2002 *Annual ACM-SIAM Symposium on Discrete Algorithms,* 2002. In such an example, there may be a number of k/2 nodes, where each successive node may contain aggregated data of an exponential number of time periods as compared to nodes located earlier in the list. For example, each successive node may contain aggregated data of 1 day, 2 days, 4 days, 8 days, and etcetera. An insertion policy may be similar in many respects to insertion policies described elsewhere herein. However, during insertion of new user interaction data statistics, such an insertion policy may govern when to aggregate multiple nodes into a single node. For example, such an insertion policy may ensure that there are a maximum of k/2 nodes of each size. For example, such an insertion policy may scan such nodes and merger multiple nodes if more than k/2 of the same size nodes are found. The older of two separate nodes may be merged to create a new node of double the size. Such a merger may cause the next larger size node to have more than k/2 nodes and trigger a cascade of mergers.

In an example with k=8, a maximum of k/2=4 nodes of the same size may be provided. Such nodes may be ordered with the most recent data first. For simplicity, statistics contained in each node have been omitted, and each node shows only its size in time periods (e.g., a single day, two days, four days, etc.). For a given item X, a history might include a set of four single time period nodes, a set of four double time period nodes, and a set of two fourfold time period nodes, as follows:

X—1 1 1 1 2 2 2 2 4 4

If new user interaction data is entered into the list of a sliding window, there may be five single time period nodes. In such a case, a merge of the oldest two groups of a single time period length may be merged into a new group of a double time period length, as follows:

X—1 1 1 2 2 2 2 2 4 4

However, a cascade of mergers may be triggered. For example, the merger above resulted in a new group of a double time period length. Now there are five double time period nodes. Accordingly, a merge of the oldest two groups of a double time period length may be merged into a new group of a fourfold time period length, as follows:

X—1 1 1 2 2 2 4 4 4

A forgetting policy for such a sliding window may be similar or exactly the same as the example described above having nodes of equal size.

At block 214, a search result may be transmitted to a user based at least in part on a history of user interaction associated with a sliding window. For example, the relevancy of electronic documents and/or various aggregations of electronic documents (referred to herein as items) in a search result set may be determined based at least in part on such user interaction data associated with a sliding window. Due to the large scale of the Internet and the unique nature of the interlinked pages, search engines may employ complex relevance ranking functions. Embodiments described herein may relate to ranking of electronic documents based at least in part on user interactions. Log data of user interaction may be mined to indicate the number of times an electronic document is presented to users and/or clicked through by users, for example. Such user interaction data may be leveraged for use in computing the importance of an electronic document. For example, an importance score may be assigned to electronic documents. Such a score may then be employed as part of the overall ranking of the electronic document. For example, based at least in part on such mined user interaction data, if an electronic document is presented to a user and/or if a user clicks through to an electronic document, a higher importance may be given to those electronic documents that have received a higher number of user interactions. In other words, such electronic documents may be ranked higher if they have received a higher number of interactions from users. During calculations of the relevancy of electronic documents, such user interaction data may be weighted. For example, such user interaction data may be weighted so as to give more importance to recent data. Such weighting of user interaction data may be done by one or more methodologies, such as simple averages, an exponential weighting scheme, and/or the like.

In operation, procedure 200 may utilize sliding windows to compute many statistics about user interaction feedback with electronic documents and/or various aggregations of electronic documents (referred to herein as items). Procedure 200 may operate so as to store historical user interaction data for longer periods of time than conventional methods, and also may react to significant changes in streams of user interaction data. Procedure 200 may adapt the size of a given sliding window according to a volume of user interaction data. Such volume based adaptation of sliding windows may provide accurate estimates of user interaction for low-frequency items and/or rapid adaptability for high-frequency items. Additionally, procedure 200 may adapt the size of a given sliding window to perceived changes in recent user interaction data. For example, procedure 200 may give greater weight to recent user interaction data occurring after a statistically significant change in the quantity of incoming data. Such change based adaptation of sliding windows may provide accurate estimates of user interaction for volatile streams of user interaction data. Further, procedure 200 may facilitate efficient data storage by limiting sliding window size while still providing accurate estimates of user interaction, through change based adaptation and/or volume based adaptation of sliding windows, for example. Additionally, procedure 200 may facilitate opportunities for sophisticated modeling of streams of user interaction data. For example, procedure 200 may facilitate identification of trends in streams of user interaction data and may predict future user interaction based on such trends.

Lastly, procedure 200 may perform one or more calculations based on user interaction data at the same time a given history is being updated. Accordingly, there may be a single scan of the history during a given update and/or calculation. For example, there may be two different operations associated with a given history. One such operation associated with a given history may be to update the history and another such operation may be to use the history for various calculations. If both operation associated with a given history are done in the same scan of the history file, there may be time savings compared to having the two operations scan the same history file separately.

Figure 3:
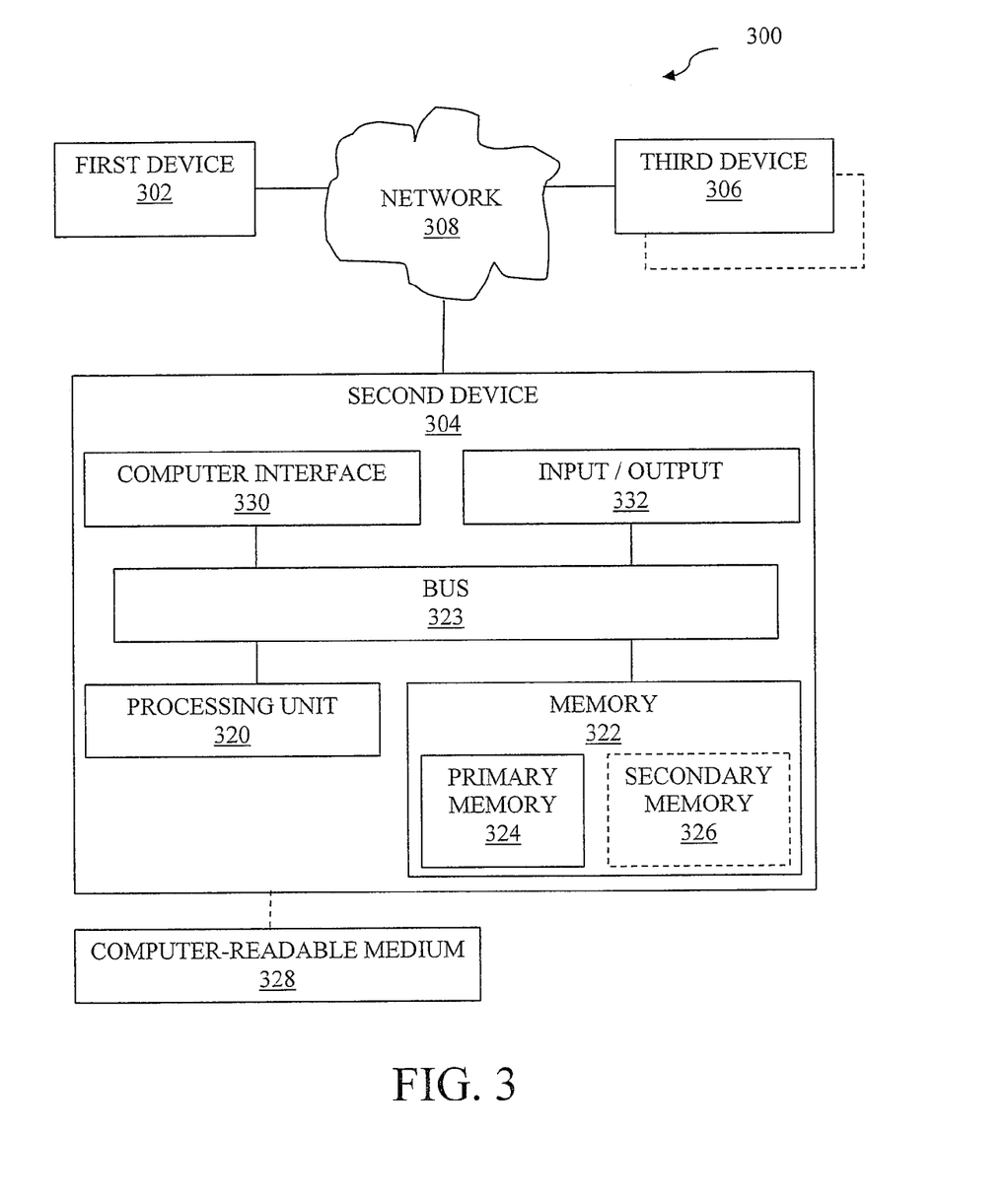
FIG. 3 is a schematic diagram of a computing platform in accordance with one or more embodiments.

FIG. 3 is a schematic diagram illustrating an exemplary embodiment of a computing environment system 300 that may include one or more devices configurable to maintain data regarding user interaction with electronic documents using one or more techniques illustrated above, for example. System 300 may include, for example, a first device 302, a second device 304, and a third device 306, which may be operatively coupled together through a network 308.

First device 302, second device 304, and third device 306, as shown in FIG. 3, may be representative of any device, appliance or machine that may be configurable to exchange data over network 308. By way of example, but not limitation, any of first device 302, second device 304, or third device 306 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof.

Similarly, network 308, as shown in FIG. 3, is representative of one or more communication links, processes, and/or resources configurable to support the exchange of data between at least two of first device 302, second device 304, and third device 306. By way of example, but not limitation, network 308 may include wireless and/or wired communication links, telephone or telecommunications systems, data buses or channels, optical fibers, terrestrial or satellite resources, local area networks, wide area networks, intranets, the Internet, routers or switches, and the like, or any combination thereof.

As illustrated, for example, by the dashed lined box illustrated as being partially obscured of third device 306, there may be additional like devices operatively coupled to network 308.

It is recognized that all or part of the various devices and networks shown in system 300, and the processes and methods as further described herein, may be implemented using, or otherwise including, hardware, firmware, software, or any combination thereof.

Thus, by way of example, but not limitation, second device 304 may include at least one processing unit 320 that is operatively coupled to a memory 322 through a bus 323.

Processing unit 320 is representative of one or more circuits configurable to perform at least a portion of a data computing procedure or process. By way of example, but not limitation, processing unit 320 may include one or more processors, controllers, microprocessors, microcontrollers, application specific integrated circuits, digital signal processors, programmable logic devices, field programmable gate arrays, and the like, or any combination thereof.

Memory 322 is representative of any data storage mechanism. Memory 322 may include, for example, a primary memory 324 and/or a secondary memory 326. Primary memory 324 may include, for example, a random access memory, read only memory, etc. While illustrated in this example as being separate from processing unit 320, it should be understood that all or part of primary memory 324 may be provided within or otherwise co-located/coupled with processing unit 320.

Secondary memory 326 may include, for example, the same or similar type of memory as primary memory and/or one or more data storage devices or systems, such as, for example, a disk drive, an optical disc drive, a tape drive, a solid state memory drive, etc. In certain implementations, secondary memory 326 may be operatively receptive of, or otherwise configurable to couple to, a computer-readable medium 328. Computer-readable medium 328 may include, for example, any medium that can carry and/or make accessible data, code and/or instructions for one or more of the devices in system 300.

Second device 304 may include, for example, a communication interface 330 that provides for or otherwise supports the operative coupling of second device 304 to at least network 308. By way of example, but not limitation, communication interface 330 may include a network interface device or card, a modem, a router, a switch, a transceiver, and the like.

Second device 304 may include, for example, an input/output 332. Input/output 332 is representative of one or more devices or features that may be configurable to accept or otherwise introduce human and/or machine inputs, and/or one or more devices or features that may be configurable to deliver or otherwise provide for human and/or machine outputs. By way of example, but not limitation, input/output device 332 may include an operatively configured display, speaker, keyboard, mouse, trackball, touch screen, data port, etc.

With regard to system 300, in certain implementations, first device 302 may be configurable to tangibly embody all or a portion of procedure 200 of FIG. 2. In certain implementations, first device 302 may be configurable to maintaining data regarding user interaction with electronic documents using one or more techniques illustrated above. For example, we can apply a process in first device 302 where such data maintenance may be utilized for accurate estimation of document relevance. Further, first device 302 may perform such data maintenance so as to adjust to changes in the system or environment, such as significant changes in levels of user interaction.

Embodiments claimed may include algorithms, programs and/or symbolic representations of operations on data bits or binary digital signals within a computer memory capable of performing one or more of the operations described herein. A program and/or process generally may be considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities.

Unless specifically stated otherwise, as apparent from the preceding discussion, it is appreciated that throughout this specification discussions utilizing terms such as processing, computing, calculating, selecting, forming, transforming, defining, mapping, converting, associating, enabling, inhibiting, identifying, initiating, communicating, receiving, transmitting, determining, displaying, sorting, applying, varying, delivering, appending, making, presenting, distorting and/or the like refer to the actions and/or processes that may be performed by a computing platform, such as a computer, a computing system, an electronic computing device, and/or other information handling system, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, processes described herein, with reference to flow diagrams or otherwise, also may be executed and/or controlled, in whole or in part, by such a computing platform.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes that fall within the true spirit of claimed subject matter.

What is claimed is:

1. The A method, comprising:
   collecting data regarding user interaction with one or more electronic documents;
   maintaining a history of said data within a sliding window, wherein said sliding window is sized based at least in part on a quantification value of said user interaction, a size of said sliding window being capable of being adjusted based at least in part on a change in said quantification value, wherein said sliding window is further sized based at least in part on a change in said user interaction that exceeds a threshold value, and wherein said change in user interaction comprises a change in click through rate; and
   transmitting a search result to a user based at least in part on said history.

2. The method of claim 1, wherein said user interaction comprises user impressions of said electronic documents, and wherein said window is sized to include at least a desired number of impressions.

3. The method of claim 1, wherein said sliding window is further sized based at least in part on a maximum time frame.

4. The method of claim 1, wherein said sliding window is further sized based at least in part on a maximum and minimum time frame.

5. The method of claim 1, further comprising collapsing at least a portion of history of said data.

6. The method of claim 1, further comprising collapsing at least a portion of history of said data, wherein said history comprises at least one node containing data collapsed together from two or more other nodes.

7. The method of claim 1, wherein said electronic document comprises a web page.

8. An article comprising: a storage medium comprising machine-readable instructions stored thereon which are executable by a computing platform to:
   collect data regarding user interaction with one or more electronic documents;
   maintain a history of said data within a sliding window, wherein said sliding window is sized based at least in part on a quantification value of said user interaction, a size of said sliding window being capable of being adjusted based at least in part on a change in said quantification value, wherein said sliding window is further sized based at least in part on a change in said user interaction that exceeds a threshold value, and wherein said change in user interaction comprises a change in click through rate; and
   transmit a search result to a user based at least in part on said history.

9. The article of claim 8, wherein said user interaction comprises user impressions of said electronic documents, and wherein said window is sized to include at least a desired number of impressions.

10. The article of claim 8, wherein said sliding window is further sized based at least in part on a maximum time frame.

11. The article of claim 8 wherein said sliding window is further sized based at least in part on a maximum and minimum time frame.

12. The article of claim 8 wherein said machine-readable instructions are further executable by said computing platform to collapse at least a portion of history of said data, wherein said history comprises at least one node containing data collapsed together from two or more other nodes.

13. An apparatus comprising: a computing platform, said computing platform being adapted to:
   collect data regarding user interaction with one or more electronic documents;
   maintain a history of said data within a sliding window, wherein said sliding window is sized based at least in part on a quantification of value of said user interaction, a size of said sliding window being capable of being adjusted based at least in part on a change in said quantification value, wherein said sliding window is further sized based at least in part on a change in said user interaction that exceeds a threshold value, and wherein said change in user interaction comprises a change in click through rate; and
   transmit a search result to a user based at least in part on said history.

14. The apparatus of claim 13, wherein said user interaction comprises user impressions of said electronic documents, and wherein said window is sized to include at least a desired number of impressions.

15. The apparatus of claim 13, wherein said computing platform is further adapted to collapse at least a portion of history of said data, wherein said history comprises at least one node containing data collapsed together from two or more other nodes.

16. The apparatus of claim 13 wherein said computing platform is further adapted to:
   collapse at least a portion of history of said data, wherein said history comprises at least one node containing data collapsed together from two or more other nodes;
   wherein said user interaction comprises user impressions of said electronic documents, and wherein said window is sized to include at least a desired number of impressions;
   wherein said sliding window is further sized based at least in part on a maximum and minimum time frame; and
   wherein said sliding window is further sized based at least in part on a maximum time frame.

* * * * *